United States Patent
Teicholz et al.

(10) Patent No.: US 10,267,326 B2
(45) Date of Patent: Apr. 23, 2019

(54) VARIABLE VANE SCHEDULING

(71) Applicant: United Technologies Corporation, Hartford, CT (US)

(72) Inventors: Matthew D. Teicholz, Mystic, CT (US); Paul H. Spiesman, Coventry, CT (US); Kerri A. Wojcik, Coventry, CT (US); John R. Gendron, Enfield, CT (US); Glenn D. Bartkowski, Manchester, CT (US); Sean D J Blake, Andover, CT (US); William G. Tempelman, Ellington, CT (US)

(73) Assignee: United Technologies Corporation, Farmington, CT (US)

( * ) Notice: Subject to any disclaimer, the term of this patent is extended or adjusted under 35 U.S.C. 154(b) by 1990 days.

(21) Appl. No.: 13/669,510

(22) Filed: Nov. 6, 2012

(65) Prior Publication Data

US 2015/0003956 A1  Jan. 1, 2015

Related U.S. Application Data

(60) Provisional application No. 61/706,418, filed on Sep. 27, 2012.

(51) Int. Cl.
*F04D 27/02* (2006.01)
*F02C 6/08* (2006.01)
(Continued)

(52) U.S. Cl.
CPC ............ *F04D 27/0246* (2013.01); *F02C 6/08* (2013.01); *F02C 9/20* (2013.01); *F04D 27/002* (2013.01);
(Continued)

(58) Field of Classification Search
CPC ... F01D 7/14; F01D 7/16; F01D 7/141; F01D 7/148; F01D 7/20; F04D 27/0246;
(Continued)

(56) References Cited

U.S. PATENT DOCUMENTS

| 3,873,230 A | 3/1975 | Norris et al. |
| 4,594,849 A * | 6/1986 | Kenison ................. G05B 17/02 60/795 |

(Continued)

FOREIGN PATENT DOCUMENTS

| EP | 1063402 B1 | 12/2000 |
| EP | 2022947 | 2/2009 |

(Continued)

OTHER PUBLICATIONS

International Search Report and Written Opinion for International Application No. PCT/US2013/059682 completed on Dec. 13, 2013.
(Continued)

*Primary Examiner* — Jason D Shanske
*Assistant Examiner* — Joshua R Beebe
(74) *Attorney, Agent, or Firm* — Carlson, Gaskey & Olds, P.C.

(57) ABSTRACT

An example variable vane scheduling method includes adjusting variable vanes from a position based on a first schedule to a position based on a different, second schedule in response to a control feature. An example method of controlling flow through a compressor of a turbomachine includes moving variable vanes to positions that allow more flow into the compressor in response to bleed air being communicated away from the compressor.

19 Claims, 3 Drawing Sheets

(51) Int. Cl.
*F02C 9/20* (2006.01)
*F04D 27/00* (2006.01)

(52) U.S. Cl.
CPC ....... *F04D 27/009* (2013.01); *F04D 27/0215* (2013.01); *F05D 2270/10* (2013.01)

(58) Field of Classification Search
CPC ...... F04D 27/02; F04D 27/009; F04D 27/002; F04D 27/0215; F02C 6/08; F05D 2270/10
USPC ......... 415/160, 162, 161, 148, 149.4, 13, 17
See application file for complete search history.

(56) References Cited

U.S. PATENT DOCUMENTS

| | | | | |
|---|---|---|---|---|
| 5,117,625 | A * | 6/1992 | McArthur | F04D 27/0246 60/785 |
| 5,184,459 | A | 2/1993 | McAndrews | |
| 5,190,439 | A * | 3/1993 | Das | F01D 17/16 415/149.4 |
| 5,357,748 | A * | 10/1994 | Khalid | F02C 9/54 60/204 |
| 6,735,955 | B2 * | 5/2004 | Mannarino | F04D 27/0246 60/794 |
| 2003/0011199 | A1 * | 1/2003 | Wickert | F01D 15/10 290/52 |
| 2006/0101826 | A1 | 5/2006 | Martis et al. | |
| 2007/0166150 | A1 * | 7/2007 | Szucs | F01D 17/162 415/160 |
| 2008/0273961 | A1 | 11/2008 | Rosenkrans et al. | |
| 2010/0162719 | A1 * | 7/2010 | Bowman | F02C 7/32 60/773 |
| 2010/0251727 | A1 * | 10/2010 | Myers | F01K 13/02 60/773 |
| 2010/0281875 | A1 * | 11/2010 | Price | F01D 17/162 60/772 |
| 2011/0018716 | A1 | 1/2011 | Piccoli et al. | |
| 2011/0142602 | A1 * | 6/2011 | Adhami | F01D 17/162 415/159 |
| 2011/0176913 | A1 * | 7/2011 | Wassynger | F01D 17/162 415/159 |
| 2012/0117974 | A1 | 5/2012 | Hilgeman et al. | |
| 2012/0317955 | A1 * | 12/2012 | Rowe | F01D 21/06 60/39.01 |
| 2015/0308353 | A1 | 10/2015 | Gardner et al. | |

FOREIGN PATENT DOCUMENTS

| | | |
|---|---|---|
| EP | 2148044 | 1/2010 |
| EP | 2383452 B1 | 11/2011 |

OTHER PUBLICATIONS

International Preliminary Report on Patentability for International Application No. PCT/US2013/059682 dated Apr. 9, 2015.
Extended European Search Report for Application No. 13840306.8 dated Oct. 9, 2015.

* cited by examiner

VARIABLE VANE SCHEDULING

CROSS-REFERENCE TO RELATED APPLICATIONS

This application claims priority to U.S. Provisional Application No. 61/706418, which was filed on 27 Sep. 2012 and is incorporated herein by reference.

BACKGROUND

Turbomachines, such as gas turbine engines, typically include a fan section, a compression section, a combustion section, and a turbine section. Turbomachines may employ a geared architecture connecting portions of the compression section to the fan section.

Variable vanes are widely used in commercial and military gas turbine engines, especially within compression sections. Variable vane position is typically scheduled as a function of corrected engine parameters and additional factors, such as throttle movements, foreign object detection, and stall detection. Variable vane positioning permits optimal airfoil incidence to protect compressor stability.

SUMMARY

A method of variable vane scheduling according to an exemplary aspect of the present disclosure includes, among other things, adjusting variable vanes from a position based on a first schedule to a position based on a different, second schedule in response to a control feature.

In a further non-limiting embodiment of the foregoing method of variable vane scheduling, the control feature comprises an amount of bleed air.

In a further non-limiting embodiment of either of the foregoing methods of variable vane scheduling, the first schedule may include positions that permit a first amount of flow into a compressor, and the second schedule may include positions that permit a second amount of flow into the compressor. The first amount is less than the second amount.

In a further non-limiting embodiment of any of the foregoing methods of variable vane scheduling, the variable vanes may be adjusted according to the first schedule when the amount of bleed air is relatively low, and the variable vanes may be adjusted according to the second schedule when the amount of bleed air is relatively high.

In a further non-limiting embodiment of any of the foregoing methods of variable vane scheduling, the variable vanes may be adjusted based on the first schedule when the amount of bleed air is zero.

In a further non-limiting embodiment of any of the foregoing methods of variable vane scheduling, the variable vanes may control flow through a compressor of a turbomachine, and the first and the second schedules determine the position based on a variable that includes at least a rotational speed of a rotor of the compressor and a temperature of the compressor.

In a further non-limiting embodiment of any of the foregoing methods of variable vane scheduling, the variable may include the rotational speed divided by the temperature.

In a further non-limiting embodiment of any of the foregoing methods of variable vane scheduling, the temperature may be a compressor inlet temperature.

In a further non-limiting embodiment of any of the foregoing methods of variable vane scheduling, the method may use a position of a bleed valve to determine the amount of bleed air.

A turbomachine controller assembly according to an exemplary aspect of the present disclosure includes, among other things, a controller configured to adjust an array of variable vanes within a compressor, wherein the controller adjusts the array according to a first schedule when a first amount of bleed air is communicated from the compressor, and adjusts the array according to a second schedule when a different, second amount of bleed air is communicated from the compressor.

In a further non-limiting embodiment of the foregoing turbomachine controller assembly, the first schedule may include positions that permit less flow through the compressor than the positions of the second schedule.

In a further non-limiting embodiment of either of the foregoing turbomachine controller assemblies, the second amount of bleed air may comprise no bleed air communicated from the compressor.

In a further non-limiting embodiment of any of the foregoing turbomachine controller assemblies, the controller may monitor a bleed valve position to determine whether the first amount or the second amount of bleed air is communicated from the compressor.

In a further non-limiting embodiment of any of the foregoing turbomachine controller assemblies, the first and the second schedules may be determined based at least on a compressor rotor speed and an inlet temperature.

A method of controlling flow through a compressor of a turbomachine according to another exemplary aspect of the present disclosure includes, among other things, moving variable vanes to positions that allow more flow into the compressor in response to bleed air being communicated away from the compressor.

In a further non-limiting embodiment of the foregoing method of controlling flow through a compressor of a turbomachine, the variable vanes may be moved according to at least a first schedule or a second schedule.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
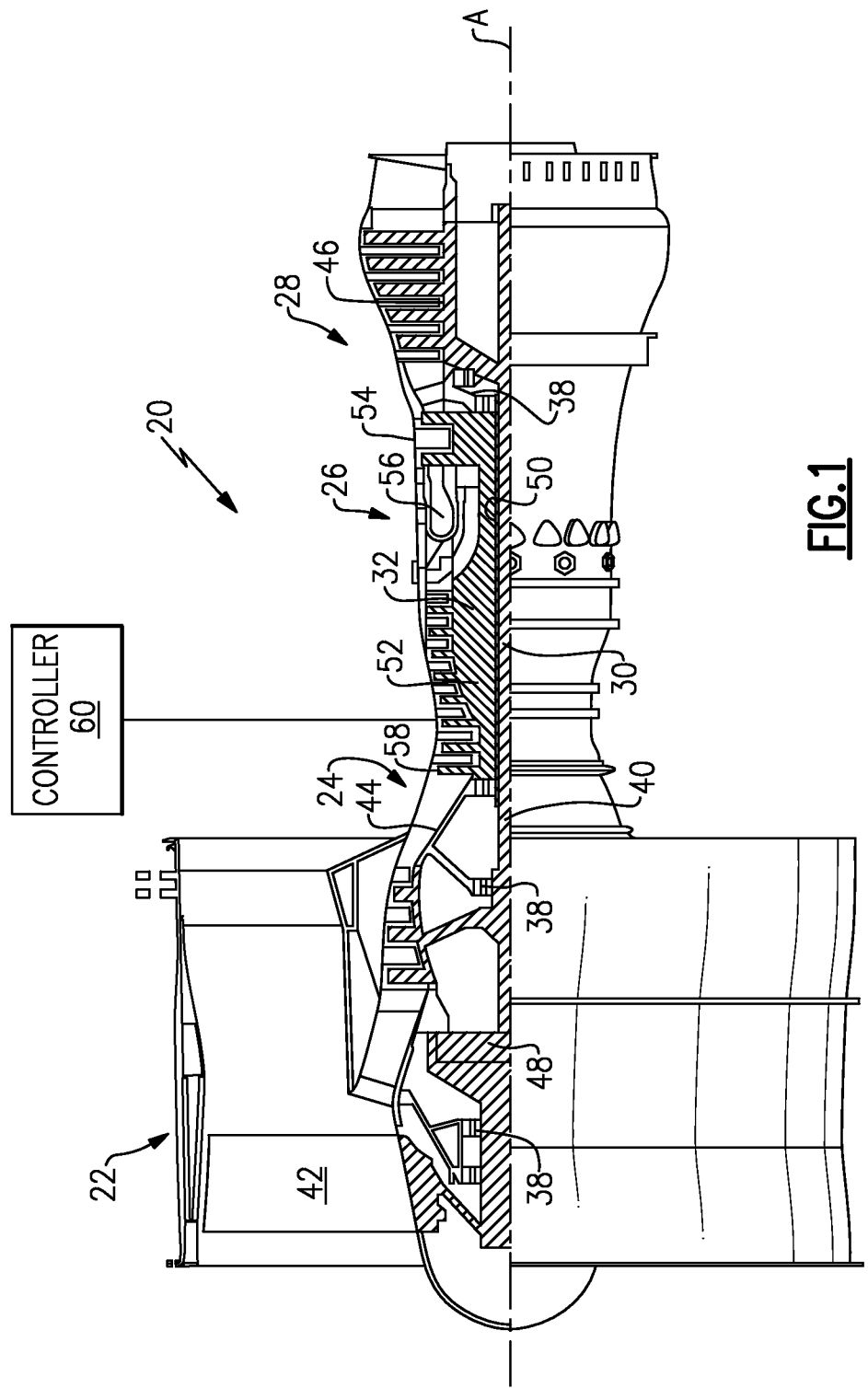
FIG. 1 shows a section view of an example turbomachine.

FIG. 1 schematically illustrates an example turbomachine, which is a gas turbine engine 20 in this example. The gas turbine engine 20 is a two-spool turbofan gas turbine engine that generally includes a fan section 22, a compression section 24, a combustion section 26, and a turbine section 28.

Although depicted as a two-spool turbofan gas turbine engine in the disclosed non-limiting embodiment, it should be understood that the concepts described herein are not limited to use with turbofans. That is, the teachings may be applied to other types of turbomachines and turbine engines including three-spool architectures. Further, the concepts described herein could be used in environments other than a turbomachine environment and in applications other than aerospace applications.

In the example engine 20, flow moves from the fan section 22 to a bypass flowpath. Flow from the bypass flowpath generates forward thrust. The compression section 24 drives air along a core flowpath. Compressed air from the compression section 24 communicates through the combustion section 26. The products of combustion expand through the turbine section 28.

The example engine 20 generally includes a low-speed spool 30 and a high-speed spool 32 mounted for rotation about an engine central axis A. The low-speed spool 30 and the high-speed spool 32 are rotatably supported by several bearing systems 38. It should be understood that various bearing systems 38 at various locations may alternatively, or additionally, be provided.

The low-speed spool 30 generally includes a shaft 40 that interconnects a fan 42, a low-pressure compressor 44, and a low-pressure turbine 46. The shaft 40 is connected to the fan 42 through a geared architecture 48 to drive the fan 42 at a lower speed than the low-speed spool 30.

The high-speed spool 32 includes a shaft 50 that interconnects a high-pressure compressor 52 and high-pressure turbine 54.

The shaft 40 and the shaft 50 are concentric and rotate via bearing systems 38 about the engine central longitudinal axis A, which is collinear with the longitudinal axes of the shaft 40 and the shaft 50.

The combustion section 26 includes a circumferentially distributed array of combustors 56 generally arranged axially between the high-pressure compressor 52 and the high-pressure turbine 54.

In some non-limiting examples, the engine 20 is a high-bypass geared aircraft engine. In a further example, the engine 20 bypass ratio is greater than about six (6 to 1).

The geared architecture 48 of the example engine 20 includes an epicyclic gear train, such as a planetary gear system or other gear system. The example epicyclic gear train has a gear reduction ratio of greater than about 2.3 (2.3 to 1).

The low-pressure turbine 46 pressure ratio is pressure measured prior to inlet of low-pressure turbine 46 as related to the pressure at the outlet of the low-pressure turbine 46 prior to an exhaust nozzle of the engine 20. In one non-limiting embodiment, the bypass ratio of the engine 20 is greater than about ten (10 to 1), the fan diameter is significantly larger than that of the low-pressure compressor 44, and the low-pressure turbine 46 has a pressure ratio that is greater than about 5 (5 to 1). The geared architecture 48 of this embodiment is an epicyclic gear train with a gear reduction ratio of greater than about 2.5 (2.5 to 1). It should be understood, however, that the above parameters are only exemplary of one embodiment of a geared architecture engine and that the present disclosure is applicable to other gas turbine engines including direct drive turbofans.

In this embodiment of the example engine 20, a significant amount of thrust is provided by the bypass flow B due to the high bypass ratio. The fan section 22 of the engine 20 is designed for a particular flight condition—typically cruise at about 0.8 Mach and about 35,000 feet. This flight condition, with the engine 20 at its best fuel consumption, is also known as "Bucket Cruise" Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example engine 20 is less than 1.45 (1.45 to 1).

"Low Corrected Fan Tip Speed" is the actual fan tip speed in ft/sec divided by an industry standard temperature correction of $[(Tram\ °R)/(518.7\ °R)]^{0.5}$. The Temperature represents the ambient temperature in degrees Rankine. The Low Corrected Fan Tip Speed according to one non-limiting embodiment of the example engine 20 is less than about 1150 fps (351 m/s).

The engine 10 includes arrays of variable vanes 58 extending radially from the axis A. The variable vanes 58 are positioned, in this example, near the inlet to the high-pressure compressor 52. The low-pressure compressor 44 may include variable vanes in some examples.

The variable vanes 58 are adjusted between positions that permit more flow and positions that permit less flow into the high-pressure compressor 52. The variable vanes 58 are typically adjusted by rotating the variable vanes 58 about radially extending axes, as is known.

Figure 2:
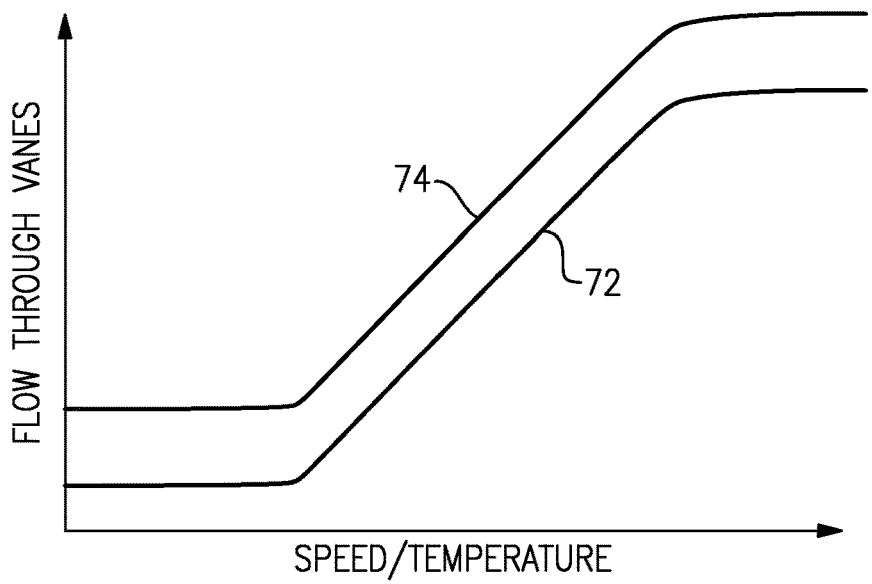
FIG. 2 shows example schedules for variable vanes of the turbomachine of FIG. 1.

Referring the FIG. 2 with continuing reference to FIG. 1, the example controller 60 adjusts the positions of the variable vanes 58 according to a first schedule 72 or a second schedule 74. The first schedule 72 specifies a first position for the variable vanes 58 for a given variable from the engine 20. The second schedule 74 specifies a different, second position for the variable vanes 58 for the variable from the engine 20. At a given variable, the first position of the first schedule 72 permits less flow through the variable vanes 58 to the high-pressure compressor 52 than the second position of the second schedule 74.

The variable is typically the rotational speed of the high-speed spool 32 divided by a temperature at an inlet to the high-pressure compressor 52. Other variables are possible. The first positions in the first schedule 72 and the second positions in the second schedule 74 are functions of the variables in this example.

Figure 3:
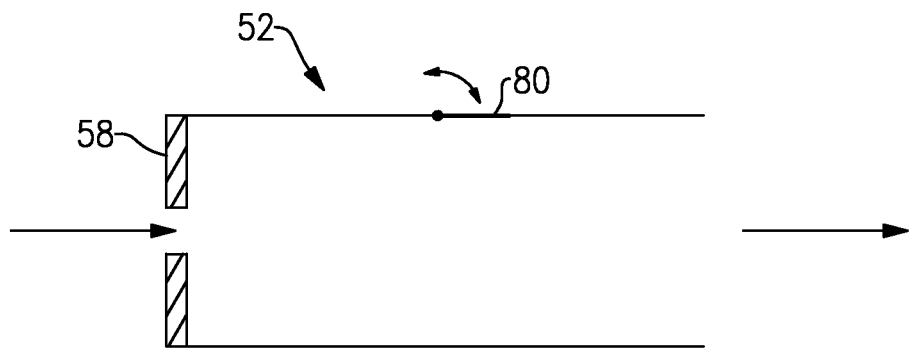
FIG. 3 shows a highly schematic view of flow entering a compression section of the turbomachine of FIG. 1 when a bleed valve is in a position permitting less bleed flow.
Figure 4:
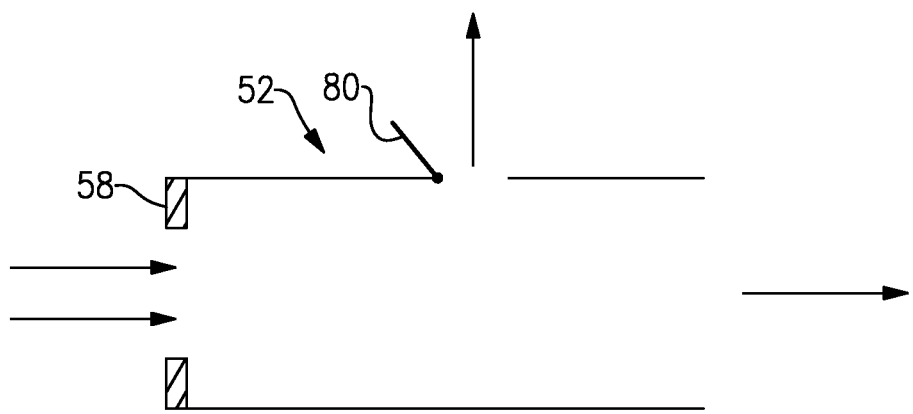
FIG. 4 shows a highly schematic view of flow entering a compression section of the turbomachine of FIG. 1 when a bleed valve is in a position permitting more bleed flow.

Referring now to FIGS. 3 and 4, the controller 60 moves the variable vanes 58 according to the first schedule 72 depending on a control feature, such as when a bleed valve 80 of the high-pressure compressor 52 is closed and not communicating bleed air from the high-pressure compressor 52. The controller 60 moves the variable vanes 58 according to the second schedule 74 when the bleed valve 80 of the high-pressure compressor 52 is open and communicating bleed air from the high-pressure compressor 52.

In another example, the controller 60 moves the variable vanes 58 according to the first schedule 72 when horsepower extraction of an aircraft associated with the engine 20 is above a set value, and moves the variable vanes 58 according to the second schedule 72 when horsepower extraction of the aircraft is below the set value.

In some examples, the set value represents different levels of horsepower, such as no horsepower, normal horsepower, and maximum horsepower. The specific value of the horsepower (hp) may vary significantly based on the type of engine 20 and aircraft. For example, one engine may use 0 hp, 100 hp, and 200 hp. In such an example, 0 hp may correspond to a failure case when a generator of the engine 20 is malfunctioning and is turned off, 100 hp may be 'normal' load on the engine 20 during the entire mission (having no flight condition dependence), and 200 hp may correspond to a maximum load during icing conditions with multiple flight surfaces moving and gear deploying. Another engine may use 0 hp, 75 hp, and 150 hp as the different levels of horsepower.

This mode of operation, which uses horsepower extraction rather than bleed air as the control feature, may be especially relevant if the engine 20 has all electric offtakes. Example of such engines include engines that rely on mechanical energy extraction (horsepower) to provide breathing air and run aircraft control surfaces. Other engines, by contrast, extract bleed air from the compressor for the cabin and use hydraulic pumps attached to the engine to power the control surfaces. Both bleed air and horsepower extraction influence stability of the high-pressure compressor 52. Other examples use control features other than bleed air or horsepower extraction.

In this example, opening the bleed valve 80 permits bleed air to move from the high-pressure compressor 52. The bleed valve 80 may be a single valve, or several valves and passages that selectively permit movement of bleed air from the high-pressure compressor 52. The valves and passages may be at several stages of the high-pressure compressor 52.

Bleed air is moved from the high-pressure compressor 52 to, for example, cool various components of the engine 20, such a vanes and blades. Moving bleed air from the high-pressure compressor 52 means that less air passes from the high-pressure compressor 52 to the combustors 56, and to the turbine section 28. Less air moving to the turbine section 28 may reduce the useful life of components within the turbine section 28, especially in high-bypass ratio engines.

The example controller 60 compensates for the bleed air moving from the high-pressure compressor 52 by adjusting the variable vanes 58 according to the second schedule 74 when the bleed air is moving from the high-pressure compressor 52. The second schedule 74, at a given speed and temperature, permits more flow into the high-pressure compressor 52 than the first schedule 72.

The controller 60 may monitor a position of the bleed valve 80 to determine whether bleed air is moving from the high-pressure compressor 52. The controller 60 may monitor whether bleed air is moving from the high-pressure compressor 52 in some other way, such as via a sensor that detects bleed air.

Figure 5:
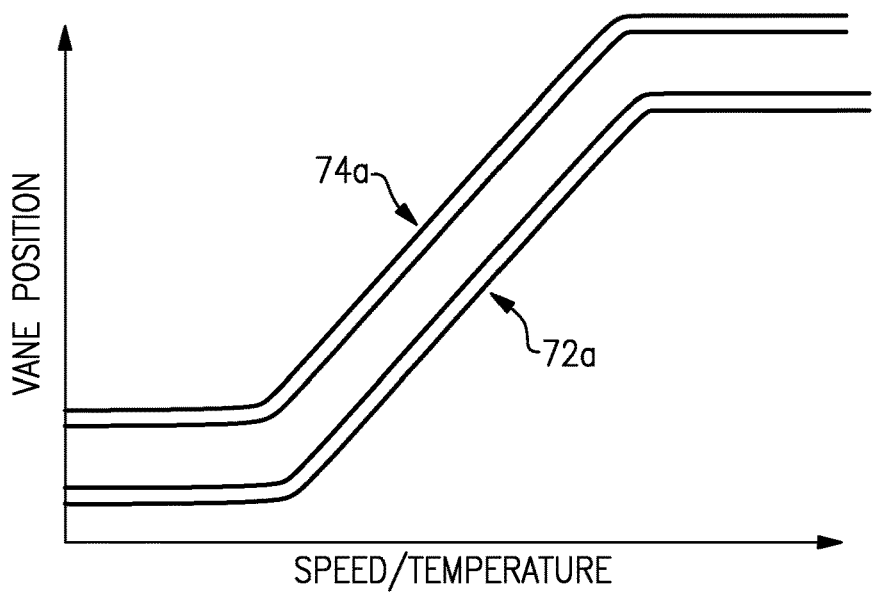
FIG. 5 shows example bounded schedules for variable vanes of the turbomachine of FIG. 1.

Various vane schedules are created to optimize performance of the engine 10. The first and second schedules may include a range of positions, as shown in the schedules 72a and 74a of FIG. 5. The upper boundaries of the schedules 72a and 74a may represent the stability limits associated with the variable vanes 58.

Although described as two distinct vane schedules, more than two vane schedules may be used. For example, the variable vanes may be adjusted according to a first schedule when a bleed valve is closed, a second schedule when the bleed valve is partially open, and a third schedule when the bleed valve is fully open.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A variable vane scheduling method, comprising:
    adjusting variable vanes from a position based on a first schedule to a position based on a different, second schedule in response to a control feature that includes at least an amount of bleed air,
    wherein the variable vanes control flow through a compressor of a turbomachine, and the first and the second schedules determine the position based on a variable that includes at least a rotational speed of a rotor of the compressor and a temperature of the compressor.

2. The variable vane scheduling method of claim 1, wherein the first schedule includes positions that permit a first amount of flow into the compressor, and the second schedule includes positions that permit a second amount of flow into the compressor, the first amount less than the second amount.

3. The variable vane scheduling method of claim 1, wherein the variable vanes are adjusted according to the first schedule when the amount of bleed air is relatively low, and the variable vanes are adjusted according to the second schedule when the amount of bleed air is relatively high.

4. The variable vane scheduling method of claim 3, wherein the variable vanes are adjusted based on the first schedule when the amount of bleed air is zero.

5. The variable vane scheduling method of claim 1, wherein the variable includes the rotational speed divided by the temperature.

6. The variable vane scheduling method of claim 1, wherein temperature is a compressor inlet temperature.

7. The variable vane scheduling method of claim 1, including using a position of a bleed valve to determine the amount of bleed air.

8. The variable vane scheduling method of claim 1, further comprising adjusting the variable vanes according to the first schedule when a bleed valve is closed, the second schedule when the bleed valve is partially open, and a third schedule when the bleed valve is fully open.

9. The variable vane scheduling method of claim 1, wherein the turbomachine is a propulsion engine comprising a fan.

10. A turbomachine controller assembly, comprising:
    a controller configured to adjust an array of variable vanes within a compressor, wherein the controller adjusts the array according to a first schedule when a first amount of bleed air is communicated from the compressor, and adjusts the array according to a second schedule when a different, second amount of bleed air is communicated from the compressor,
    wherein the first and the second schedules determine the position based on a variable that includes at least a rotational speed of a rotor of the compressor and a temperature of the compressor.

11. The turbomachine controller assembly of claim 10, wherein the first schedule includes positions that permit less flow through the compressor than the positions of the second schedule.

12. The turbomachine controller assembly of claim 11, wherein the second amount of bleed air comprises no bleed air communicated from the compressor.

13. The turbomachine controller assembly of claim 10, wherein the controller monitors a bleed valve position to determine whether the first amount or the second amount of bleed air is communicated from the compressor.

14. The turbomachine controller assembly of claim 10, wherein the first and the second schedules are determined based at least on a compressor rotor speed and an inlet temperature.

15. The turbomachine controller assembly of claim 10, wherein the controller adjusts the array of variable vanes according to the first schedule when a bleed valve is closed, the second schedule when the bleed valve is partially open, and a third schedule when the bleed valve is fully open.

16. The turbomachine controller assembly of claim 10, wherein the array and the compressor are part of a propulsion engine that includes a fan.

17. A method of controlling flow through a compressor of a turbomachine, comprising:
- moving variable vanes according to a first schedule or a second schedule in response to bleed air being communicated away from the compressor,
- wherein the variable vanes control flow through the compressor, and the first and the second schedules determine the position based on a variable that includes at least a rotational speed of a rotor of the compressor and a temperature of the compressor.

18. The method of claim 17, further comprising moving the variable vanes according to the first schedule when a bleed valve is closed, the second schedule when the bleed valve is partially open, and a third schedule when the bleed valve is fully open.

19. The method of claim 17, wherein the variable vanes and the compressor are part of a propulsion engine that includes a fan.

\* \* \* \* \*